(12) United States Patent
Pomish et al.

(10) Patent No.: US 11,383,661 B2
(45) Date of Patent: Jul. 12, 2022

(54) PRE-COLLISION SYSTEM FOR ENTERING WATER

(71) Applicant: Toyota Motor Engineering & Manufacturing North America, Inc., Plano, TX (US)

(72) Inventors: Ethan Pomish, Livonia, MI (US); Joseph Conners, Royal Oak, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 229 days.

(21) Appl. No.: 16/799,378

(22) Filed: Feb. 24, 2020

(65) Prior Publication Data

US 2021/0261076 A1  Aug. 26, 2021

(51) Int. Cl.
*B60R 21/01* (2006.01)
*B60W 10/30* (2006.01)
*B60R 21/00* (2006.01)

(52) U.S. Cl.
CPC ............. *B60R 21/01* (2013.01); *B60W 10/30* (2013.01); *B60R 2021/0016* (2013.01); *B60R 2021/0027* (2013.01); *B60R 2021/01286* (2013.01); *B60W 2420/52* (2013.01); *B60W 2710/30* (2013.01)

(58) Field of Classification Search
CPC ............ B60R 21/01; B60R 2021/0016; B60R 2021/0027; B60R 2021/01286; B60R 21/013; B60W 10/30; B60W 2420/52; B60W 2710/30
See application file for complete search history.

(56) References Cited

U.S. PATENT DOCUMENTS

| | | | |
|---|---|---|---|
| 7,375,625 B2 | 5/2008 | Fujioka | |
| 7,889,087 B2 | 2/2011 | Boss et al. | |
| 8,073,577 B2 | 12/2011 | Kitamura et al. | |
| 9,940,834 B1 | 4/2018 | Konrardy et al. | |
| 10,018,475 B2 | 7/2018 | Hakeem et al. | |
| 10,255,782 B1 | 4/2019 | Ghannam et al. | |
| 2015/0370259 A1* | 12/2015 | Sheu | B60J 7/0573 701/49 |
| 2017/0096144 A1 | 4/2017 | Elie et al. | |
| 2020/0130622 A1* | 4/2020 | Lerner | G01C 21/3697 |

FOREIGN PATENT DOCUMENTS

| | | | |
|---|---|---|---|
| CN | 103661173 A | | 1/2016 |
| CN | 105015470 B | | 1/2018 |
| CN | 108944764 A | | 12/2018 |
| CN | 110641407 B | * | 2/2021 |
| JP | H11287068 A | | 10/1999 |
| JP | 2005336831 A | | 12/2005 |
| JP | 2009068265 A | | 4/2009 |
| KR | 19980025194 A | * | 7/1998 |
| KR | 2015018042 A | | 2/2015 |

* cited by examiner

*Primary Examiner* — Brian P Sweeney
(74) *Attorney, Agent, or Firm* — Snell & Wilmer LLP

(57) ABSTRACT

Methods, systems, and apparatus for automatically responding to a vehicle falling into water. The system includes a sensor configured to detect sensor data indicating whether the vehicle is falling into water. The system also includes an electronic control unit (ECU) connected to the sensor. The ECU is configured to determine that the vehicle is falling into water based on the sensor data. The ECU is also configured to adjust at least one feature of the vehicle in response to the determination that the vehicle is falling into water.

20 Claims, 6 Drawing Sheets

PRE-COLLISION SYSTEM FOR ENTERING WATER

BACKGROUND

1. Field

This specification relates to a system and a method for automatically sensing whether a vehicle is falling into water and performing one or more actions for occupant safety.

2. Description of the Related Art

A vehicle may unintentionally become submerged in water. The vehicle may be accidentally driven into water, or the vehicle may slide into water. The safety of the occupants of the vehicle may be put in jeopardy when the vehicle is submerged in water, as the pressure outside of the vehicle underwater may be greater than the pressure within the passenger cabin, making it a challenge for occupants to open doors to escape. When a vehicle is submerged in water, a panic may set in for the occupants of the vehicle, and they may not quickly be able to determine the proper steps to take to address their safety. In addition, some occupants may not even be aware that they are in danger.

Therefore, there is a need for a system and a method for automatically sensing whether a vehicle is falling into water, and performing safety measures.

SUMMARY

What is described is a system for automatically responding to a vehicle falling into water. The system includes a sensor configured to detect sensor data indicating whether the vehicle is falling into water. The system also includes an electronic control unit (ECU) connected to the sensor. The ECU is configured to determine that the vehicle is falling into water based on the sensor data. The ECU is also configured to adjust at least one feature of the vehicle in response to the determination that the vehicle is falling into water.

Also described is a vehicle. The vehicle includes a sensor configured to detect sensor data indicating whether the vehicle is falling into water. The vehicle also includes an electronic control unit (ECU) connected to the sensor. The ECU is configured to determine that the vehicle is falling into water based on the sensor data. The ECU is also configured to adjust at least one feature of the vehicle in response to the determination that the vehicle is falling into water.

Also described is a method for automatically responding to a vehicle falling into water. The method includes detecting, by a sensor, sensor data indicating whether the vehicle is falling into water. The method also includes determining, by an electronic control unit (ECU), that the vehicle is falling into water based on the sensor data. The method also includes adjusting, by the ECU, at least one feature of the vehicle in response to the determination that the vehicle is falling into water.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for automatically sensing whether a vehicle is falling into water. The systems, vehicles, and methods disclosed herein perform one or more actions to assist occupants from exiting the vehicle when it is detected that the vehicle is falling into water. The vehicle may use a plurality of sensors in determining whether the vehicle is falling into water and/or in water, in order to improve the accuracy of detection of the vehicle being submerged or partially submerged.

The systems and methods described herein are more accurate and responsive than other systems for detecting that the vehicle has encountered water or flooding. In addition, the systems and methods described herein automatically perform one or more actions to assist the occupants in safely exiting the vehicle. Conventionally, when a vehicle with occupants inside becomes submerged or partially submerged in water, the occupants may be overcome with fright, and may not be able to think clearly and responsively. In addition, certain situations or circumstances may prevent the occupants from safely exiting the vehicle even if the occupants are aware of the situation and act quickly.

The systems and methods described herein promote the safety of occupants within the vehicle as well as the safety of emergency responders who put their own lives at risk when rescuing occupants in submerged or partially submerged vehicles.

Figure 1:
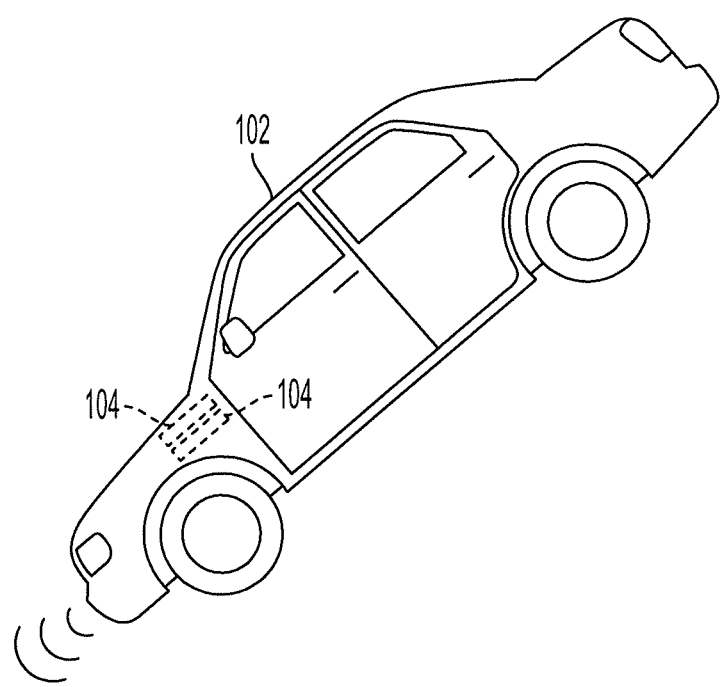
FIG. 1 illustrates a vehicle falling into water, according to various embodiments of the invention.

FIG. 1 illustrates a vehicle 102 that is falling toward water 106. The vehicle 102 includes one or more sensors 104 configured to detect the condition of falling toward the water 106. A combination of multiple sensors 104 may be used to detect the condition of falling toward the water 106, to ensure a level of certainty regarding the falling detection.

The sensors 104 may include an inertial measurement unit (IMU) configured to detect vertical acceleration (e.g., a falling condition). The IMU may also detect orientation data, including a roll, a pitch, and a yaw of the vehicle 102. The IMU may detect that the current pitch of the vehicle 102 exceeds a pitch threshold angle away from level. Similarly, the IMU may detect that the current roll of the vehicle 102 exceeds a roll threshold angle away from level, and the IMU may detect that the current yaw of the vehicle 102 exceeds a yaw threshold angle away from level. In some embodiments, when any one of the threshold angles is exceeded, a fall may be detected. In some embodiments, when the detected angles combined exceeds a combined threshold, a fall may be detected.

The sensors 104 may also include a location sensor (e.g., GPS unit) configured to detect location data. Map data stored in a memory of the vehicle may be used to determine the location of the vehicle on a map based on the detected location data. The map may indicate what areas are land and what areas are water. For example, the location sensor may detect location data in the form of latitude and longitude coordinates. The location sensor may detect a current location of the vehicle as 37.878946 latitude, −122.317034 longitude. The map data may indicate that 37.878946 latitude, −122.317034 longitude is inside a body of water. In another example, the location sensor may detect a current location of the vehicle as 37.879881 latitude, −122.269383 longitude. The map data may indicate that 37.879881 latitude, −122.269383 longitude is on land. When the location is detected as corresponding to water, the vehicle 102 may detect that the vehicle 102 is falling toward water.

The sensors 104 may also include a spatial sensor (e.g., RADAR or LIDAR) configured to detect spatial data of the environment around the vehicle 102. Water may have a different signature than solid ground, or other surfaces, such as sand and grass, and the spatial data may be able to detect the signature of water in front of the vehicle 102 and detect that the vehicle 102 is falling toward water.

The sensors 104 may also include suspension sensors configured to detect a stroke of the suspension. When the stroke is fully extended or near a full extension, the vehicle 102 may detect based on the suspension stroke data that the vehicle 102 is falling.

The sensors 104 may also include wheel rotation sensors configured to detect a rotation of the wheels. When the wheels are rotating at a relatively high level compared to change in location detected by a location sensor, the vehicle 102 may detect that the vehicle 102 is falling based on the wheel speed data, as a vehicle 102 that is not contacting the ground may encounter wheel speeds that are higher than normal.

The sensors 104 may also include image sensors configured to detect image data. The image data may be analyzed by a computing device (e.g., an ECU or other controller having a processor and a non-transitory memory) and the computing device may determine that the vehicle 102 is falling toward water. For example, the image sensor may be at the front of the vehicle 102 and the image data detected by the image sensor may show water being approached. The computing device may use machine learning techniques to determine that water is being approached.

A combination of one or more sensors of the sensors 104 of the vehicle 102 may be used to determine that the vehicle 102 is falling toward water. In some embodiments, a threshold number of sensors must indicate that the vehicle 102 is falling toward water before one or more actions are performed by the vehicle 102. For example, the threshold number may be three, such that three or more sensors 104 must detect that vehicle 102 is falling toward water (e.g., the IMU detects vertical falling, the suspension sensor detects full extension of suspension stroke, and the spatial sensor detects water approaching the vehicle).

Detection by a first sensor may trigger one or more other sensors to confirm whether the vehicle 102 is falling toward water. For example, when the location sensor determines that the vehicle 102 is no longer on a road and is now over a body of water, the IMU and/or the suspension sensor may be activated and used to confirm whether the vehicle 102 is indeed falling toward water.

It is important to be sufficiently confident about the determination of the vehicle 102 falling toward water, as opposed to other surfaces (e.g., road, grass, or sand), as some of the actions taken in preparation for entering water may not be suitable when the vehicle is falling toward the other surfaces.

The sensors 104 may also include moisture sensors configured to detect moisture data indicating whether the vehicle 102 is currently in water. The moisture data may indicate a degree by which the vehicle 102 is submerged.

FIGS. 2A-2D illustrate some of the actions the vehicle 102 may take in preparation for entering water.

Figure 2A:
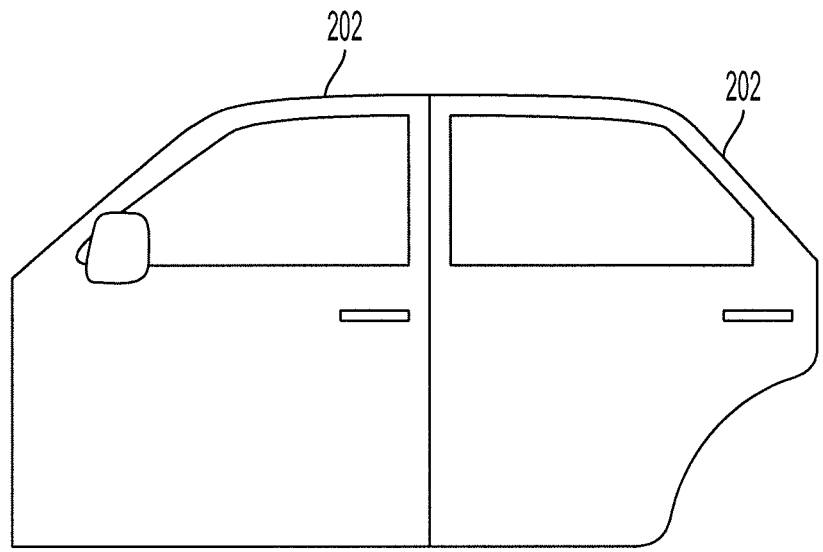
FIGS. 2A-2D illustrate various safety actions that may be taken, according to various embodiments of the invention.

FIG. 2A illustrates doors 202 of the vehicle 102, with the doors 202 in a closed state. While passenger cabin doors are shown, the foregoing may also apply to a trunk door of the vehicle 102.

Figure 2B:
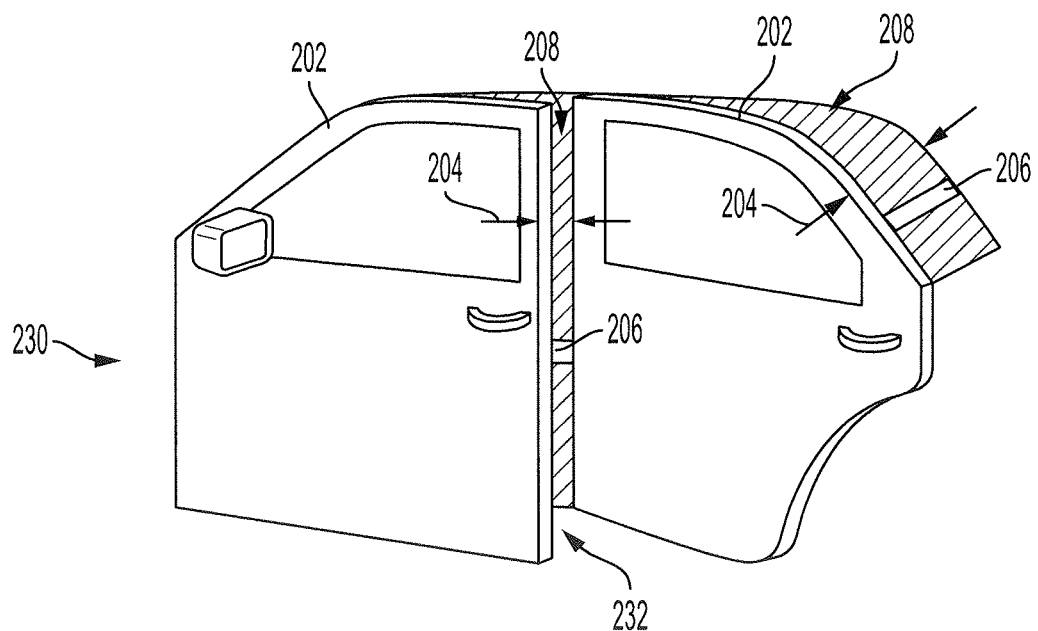

FIG. 2B illustrates the doors 202 of the vehicle 102 being opened. The doors 202 are in a partially opened state that is between fully opened and fully closed. In the fully closed state, the doors 202 are secured to the body of the vehicle 102. The doors 202 may be secured by a respective latch for each door that may be opened using a respective door handle. In the fully opened state, the doors 202 may be fully pivoted away from the body of the vehicle 102. In the partially opened state, the doors 202 may be secured to the body of the vehicle 102 using a respective anchor 206 that connects the door 202 to the body of the vehicle 102. The door 202 may be pivotably connected to the body of the vehicle 102 at a first end 230 of the door 202 and the door 202 may be secured to the body of the vehicle 102 via the anchor 206 at a second end 232 of the door 202 opposite the first end of the door.

The anchor 206 may be a part of the latching device for securing the door 202 to the body of the vehicle 102, and the anchor 206 may push the second end 232 of the door 202 outward and away from the body of the vehicle 102. The anchor 206 may be extendable or rotatable, and may be powered using one or more actuators. The anchor 206 may be made of metal or any other rigid material.

The anchor 206 may open the door 202 by an opening distance 204, allowing a gap (or opening) 208 to form between the door 202 and the body of the vehicle 102. The gap 208 allows water to enter the passenger cabin of the vehicle 102 when the vehicle 102 is submerged in water. If the doors 202 remain closed, as shown in FIG. 2A, as the vehicle 102 sinks in the water, the doors 202 become harder to open, due to the pressure of the water exerted onto the door 202. By allowing the gap 208 to form between the door 202 and the body of the vehicle 102, the pressure within the passenger cabin and outside of the vehicle 102 is equal, allowing the occupants to open the door 202 and escape the vehicle 102 submerged in water.

The anchor 206 may release, allowing the door 202 to be in a more open position than shown in FIG. 2B, and being sufficiently open for occupants to exit the vehicle 102. The anchor 206 may release when the occupants open the door handle inside of the vehicle 102. The anchor 206 may also release automatically when one or more sensors detect that the vehicle 102 is no longer in free fall, and the vehicle 102 is in water.

Figure 2C:
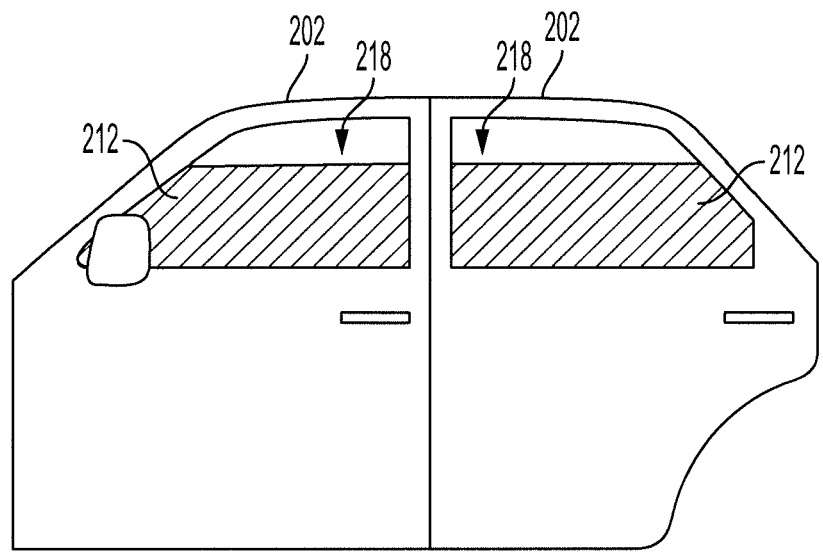

FIG. 2C illustrates windows 212 automatically lowering, causing a window gap (or opening) 218 to form in the door 202. The gap 218 allows water to enter the passenger cabin of the vehicle 102 when the vehicle 102 is submerged in water. If the doors 202 and windows 212 remain closed, as shown in FIG. 2A, as the vehicle 102 sinks in the water, the doors 202 become harder to open, due to the pressure of the water exerted onto the door 202. By allowing the window gap 218 to form, the pressure within the passenger cabin and outside of the vehicle 102 is equal, allowing the occupants to open the door 202 and escape the vehicle 102 submerged in water.

The windows 212 may automatically open more fully (to a completely open position) to allow the occupants to exit the vehicle. In some embodiments, the windows 212 may automatically open more fully when the vehicle 102 detects that it is no longer falling and located within water.

Figure 2D:
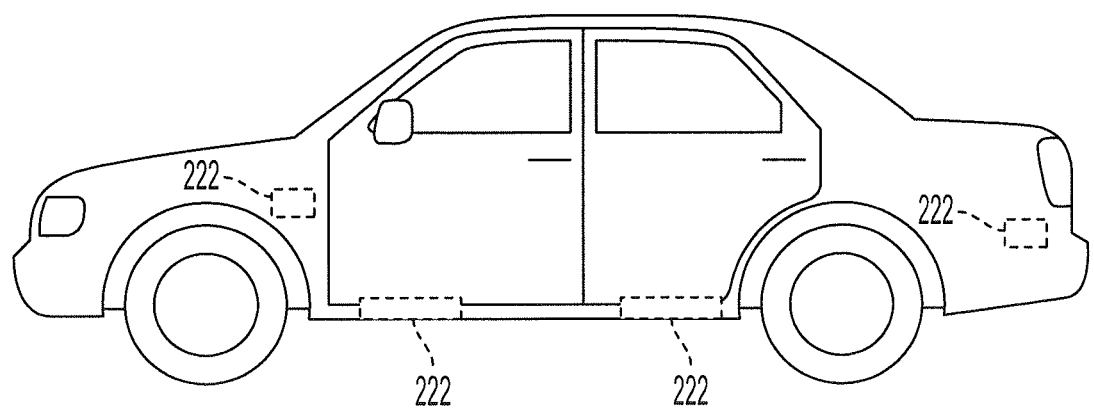

FIG. 2D illustrates pressure panels 222 located at various locations on the vehicle body. The pressure panels 222 may open when the vehicle 102 detects that the vehicle 102 is falling into water. The pressure panels 222 being open allows water to enter the passenger cabin, providing for equalization of pressure between the interior of the vehicle 102 and the exterior of the vehicle 102. This allows the occupants of the vehicle 102 to more easily open the doors 202 to exit the vehicle 102. The pressure panels 222 may be made of metal or any other rigid material. In some embodiments, the pressure panels 222 may be similar to the outer body of the vehicle.

The vehicle 102, once it has detected that it is in the water, may automatically release the seat belts to allow any occupants to be free to leave the vehicle 102 without struggling to release the seat belt latch.

Figure 3:
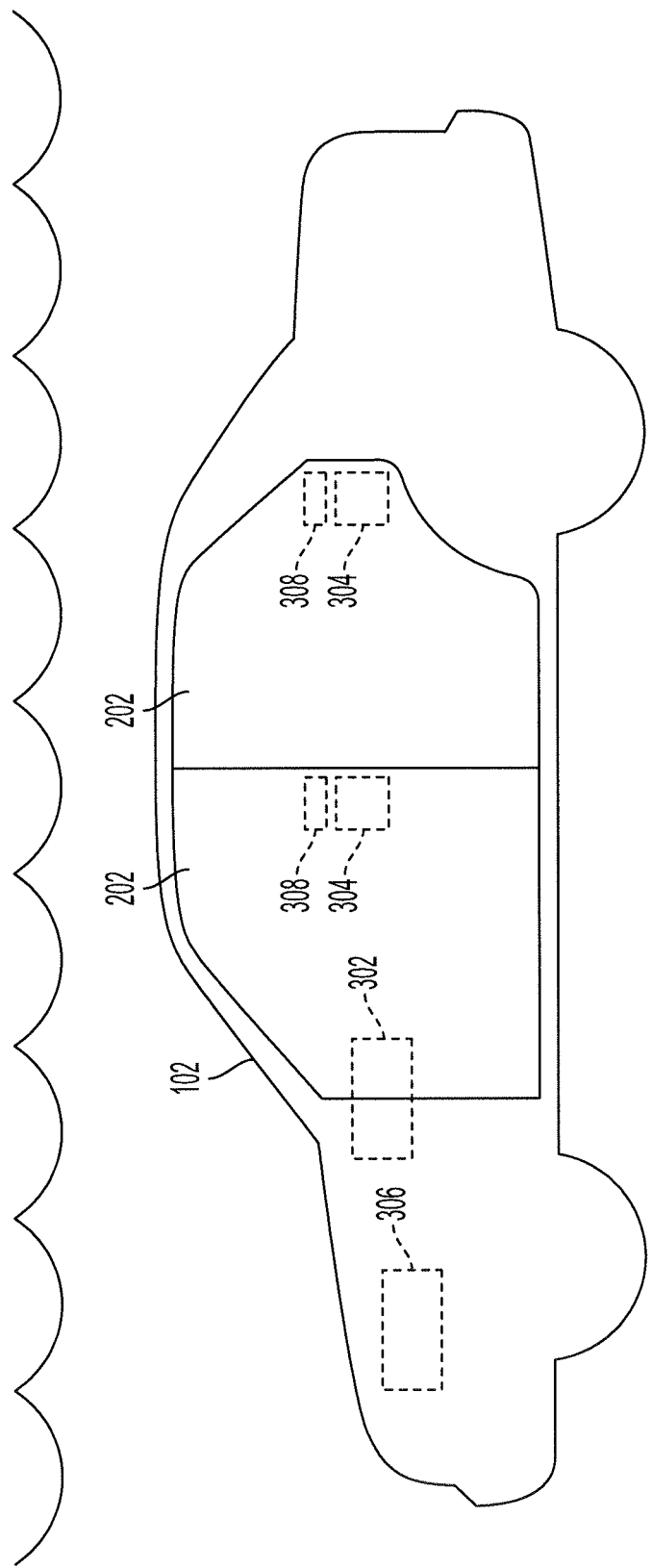
FIG. 3 illustrates various components of a vehicle to assist a vehicle already underwater, according to various embodiments of the invention.

FIG. 3 illustrates a vehicle 102 submerged underwater with the doors and windows closed. The pressure differential between the outside of the vehicle 102 and the inside of the vehicle 102 impedes opening of the doors. One or more pressure equalization devices 302 within the vehicle 102 may reduce the pressure differential, making it easier for the occupants to open the doors 202 and exit the vehicle 102.

The pressure equalization devices 302 may include an air compressor configured to compress air and increase the pressure within the passenger cabin of the vehicle 102. When the compressor discharges, at an approximately contemporaneous time, the latches 304 of the doors 202 may open (if they were not open already), causing the doors 202 to be more easily opened underwater.

The pressure equalization devices 302 may also include a hydro-compressor configured to bring water from outside of the vehicle 102 into the vehicle 102, lowering the pressure differential between the outside of the vehicle and the inside of the vehicle.

In addition, the vehicle 102 may include a door latch charge 308 near the latch 304 of the door 202 of the vehicle 102. The door latch charge 308 is configured to provide force outward and overcoming the force of the water pressure. The water pressure is outside of the vehicle and is exerted onto the door 202, and the force from the door latch charge 308 allows the door 202 to open. The door latch charge 308 may be a combustible device that may be directed in a particular direction. When the door latch charge 308 discharges, at an approximately contemporaneous time, the latches 304 of the doors 202 may open (if they were not open already), causing the doors 202 to be more easily opened underwater.

The vehicle 102 may also include multiple pressure sensors 306 configured to detect the pressure differential between the outside of the vehicle 102 and the inside of the vehicle 102. The pressure sensors 306 may include an exterior pressure sensor configured to detect exterior pressure data and an interior pressure sensor configured to detect interior pressure data, and a computing device of the vehicle (e.g., ECU) may be configured to determine the pressure differential based on the exterior pressure data and the interior pressure data.

The pressure equalization devices 302 and the door latch charge 308 may adjust their operations based on the pressure differential detected by the pressure sensors 306. For example, an air compressor configured to increase the air pressure within the vehicle 102 may provide enough air compression to meet or exceed the pressure differential, but may not provide substantially excessive air pressure, as the occupants of the vehicle may be injured by excessive increases in air pressure inside the vehicle 102, as compared to the outside water pressure. In another example, the door latch charge 308 may provide a level of force corresponding to the detected pressure differential between the outside of the vehicle 102 and the inside of the vehicle 102.

Figure 4:
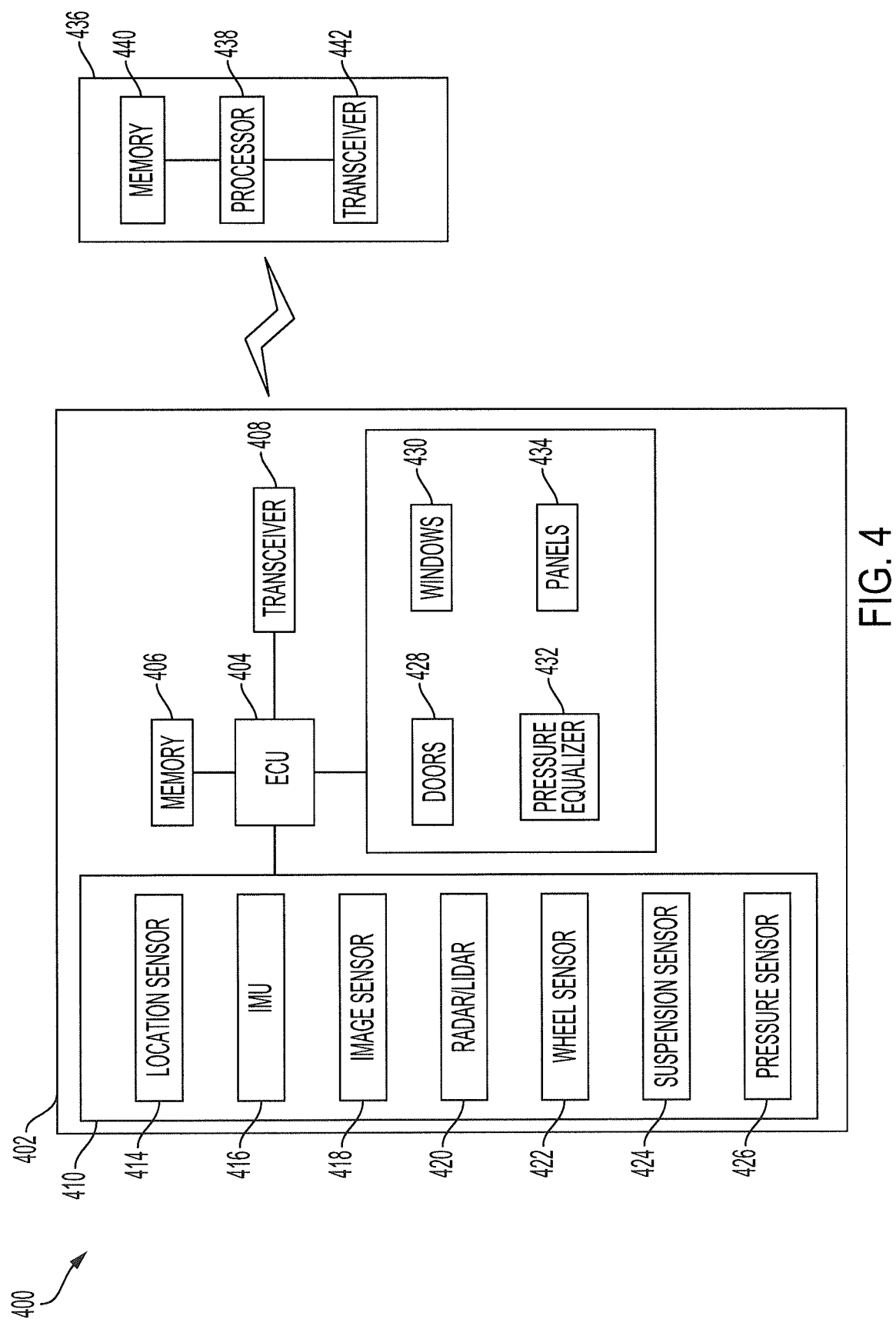
FIG. 4 is a block diagram of the system, according to various embodiments of the invention.

FIG. 4 illustrates an example system 400, according to various embodiments of the invention. The system may include a vehicle 402 (e.g., the vehicle 100). The vehicle 402 may have an automatic or manual transmission. The vehicle 402 is a conveyance capable of transporting a person, an object, or a permanently or temporarily affixed apparatus. The vehicle 402 may be a self-propelled wheeled conveyance, such as a car, a sports utility vehicle, a truck, a bus, a van or other motor or battery driven vehicle. For example, the vehicle 402 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 402 may be a semi-autonomous vehicle or an autonomous vehicle. That is, the vehicle 402 may be self-maneuvering and navigate without human input. An autonomous vehicle may use one or more sensors and/or a navigation unit to drive autonomously.

The vehicle 402 also includes one or more computers or electronic control units (ECUs) 404, appropriately programmed, to control one or more operations of the vehicle 402. The one or more ECUs 404 may be implemented as a single ECU or in multiple ECUs. The ECU 404 may be electrically coupled to some or all of the components of the vehicle 402. In some embodiments, the ECU 404 is a central ECU configured to control one or more operations of the entire vehicle. In some embodiments, the ECU 404 is multiple ECUs located within the vehicle and each configured to control one or more local operations of the vehicle. In some embodiments, the ECU 404 is one or more computer processors or controllers configured to execute instructions stored in a non-transitory memory 406.

Although FIG. 4 illustrates various elements connected to the ECU 404, the elements of the vehicle 402 may be connected to each other using a communications bus.

The vehicle 402 may be coupled to a network. The network, such as a local area network (LAN), a wide area network (WAN), a cellular network, a digital short-range communication (DSRC), the Internet, or a combination thereof, connects the vehicle 402 to a remote data server 436. The remote data server 436 may include a non-transitory memory 440, a processor 438 configured to execute instructions stored in the non-transitory memory 440, and a transceiver 442 configured to transmit and receive data to and from other devices, such as vehicle 402. The remote data server 436 may be one or more servers from different service providers. Each of the one or more servers may be connected to one or more databases. A service provider may provide navigational map, weather and/or traffic data to the vehicle.

A database is any collection of pieces of information that is organized for search and retrieval, such as by a computer or a server, and the database may be organized in tables, schemas, queries, report, or any other data structures. A database may use any number of database management systems and may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

The navigational map information includes political, roadway and construction information. The political information includes political features such as cities, states, zoning ordinances, laws and regulations, and traffic signs, such as a stop sign, or traffic signals. For example, laws and regulations may include the regulated speed on different portions of a road or noise ordinances. The roadway information includes road features such the grade of an incline of a road, a terrain type of the road, or a curvature of the road. The construction information includes construction features such as construction zones and construction hazards.

The features, e.g., road features, political features, or traffic data, each have a location that may be identified by map coordinates. The map coordinates may be defined by latitude and longitude coordinates.

The transceiver 408 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G, 4G, or 5G). The transceiver 408 may transmit data to and receive data from devices and systems not directly connected to the vehicle. For example, the ECU 404 may communicate with the remote data server 436. Furthermore, the transceiver 408 may access the network, to which the remote data server 436 is also connected.

The vehicle 402 includes a sensor array 410 connected to the ECU. The sensor array includes a location sensor 414, an inertial measurement unit (IMU) 416, an image sensor 418, a RADAR/LIDAR device 420, a wheel sensor 422, a suspension sensor 424, and a pressure sensor 426, each as described herein.

The location sensor 414 is configured to determine location data. The location sensor 414 may be a GPS unit or any other device for determining the location of the vehicle 402. The ECU 404 may use the location data along with the map data to determine a location of the vehicle. In other embodiments, the location sensor 414 has access to the map data and may determine the location of the vehicle and provide the location of the vehicle to the ECU 404. The ECU 404 may use the location sensor 414 and map data stored in memory 406 to determine whether the vehicle is in a body of water.

The image sensor 418 is configured to detect image data of the road and any objects the vehicle may be approaching. The ECU 404 uses the image data from the image sensor to determine whether the vehicle is approaching and/or submerged within water.

The RADAR/LIDAR device 420 is configured to detect spatial data of the environment around the vehicle 402. The ECU 404 of the vehicle 402 may use the spatial data to determine whether the vehicle 402 is falling toward water, or whether the vehicle 402 is falling toward another type of surface, such as pavement or grass, or sand, for example.

The wheel sensor 422 is configured to detect wheel spin data. The ECU 404 may use the wheel spin data to determine whether the vehicle 402 is in a falling state. In a falling state, the wheels of the vehicle 402 may spin at a significantly higher rate compared to the accelerator pedal position, as there is no ground to oppose the rotational force of the wheels.

The suspension sensor 424 is configured to detect suspension stroke data. The ECU 404 may use the suspension stroke data to determine whether the suspension is fully extended, to determine whether the vehicle 402 is in a falling state. In a falling state, the suspension may be more extended or fully extended, as the wheels have lost contact with the ground.

The pressure sensor 426 may be one or more sensors configured to detect pressure data associated with the vehicle 402. The pressure data may include interior pressure data within the passenger cabin and exterior pressure data outside of the vehicle. The ECU 404 may use the pressure data to adjust the operations of the pressure equalizers 432.

In addition, the sensor array 410 may also include a moisture sensor configured to detect moisture data. The moisture data may indicate whether the vehicle 402 is submerged in water. The moisture sensor may be one or more moisture sensors located in various locations of the vehicle 402.

The IMU 416 is configured to detect orientation data and acceleration data. The orientation data and acceleration data may be used by the ECU 404 to determine whether the vehicle 402 is in a falling condition. The ECU 404 may use the orientation data and acceleration data as a verification of other detected data, such as location data.

The memory 406 is connected to the ECU 404 and may be connected to any other component of the vehicle. The memory 406 is configured to store any data described herein, such as the map data, the location data, and any data received from the remote data server 436 via the transceiver 408.

Once the ECU 404 has determined that the vehicle is falling toward water, the ECU 404 may instruct one or more features or devices of the vehicle 402 to perform actions to assist occupants in exiting the vehicle 402. The features or devices may include opening windows 430 (e.g., windows 212), opening doors 428 (e.g., doors 202), opening panels 434 (e.g., panels 222), and/or activating pressure equalizers 432 (e.g., pressure equalization devices 302, door latch charge 308).

The windows 430 may include the side windows as well as the front and rear windows. When the windows 430 are controlled by an actuator, the ECU 404 may instruct the windows 430 to lower, from a closed or partially closed state to a fully open state when the ECU 404 determines that the vehicle is falling toward water, as shown in FIG. 2C. When the windows 430 are not able to be controlled by an actuator, the ECU 404 may instruct the windows 430 to detach from the vehicle, such as the front windshield.

The doors 428 may include powered door hinges or latches, allowing the ECU 404 to open the doors of the vehicle when the ECU 404 determines that the vehicle is falling toward water, as shown in FIG. 2B.

The ECU 404 may instruct the panels 434 to detach from the vehicle 402 when the ECU 404 determines that the vehicle is falling toward water, as shown in FIG. 2D.

As used herein, a "unit" may refer to hardware components, such as one or more computer processors, controllers, or computing devices configured to execute instructions stored in a non-transitory memory.

Figure 5:
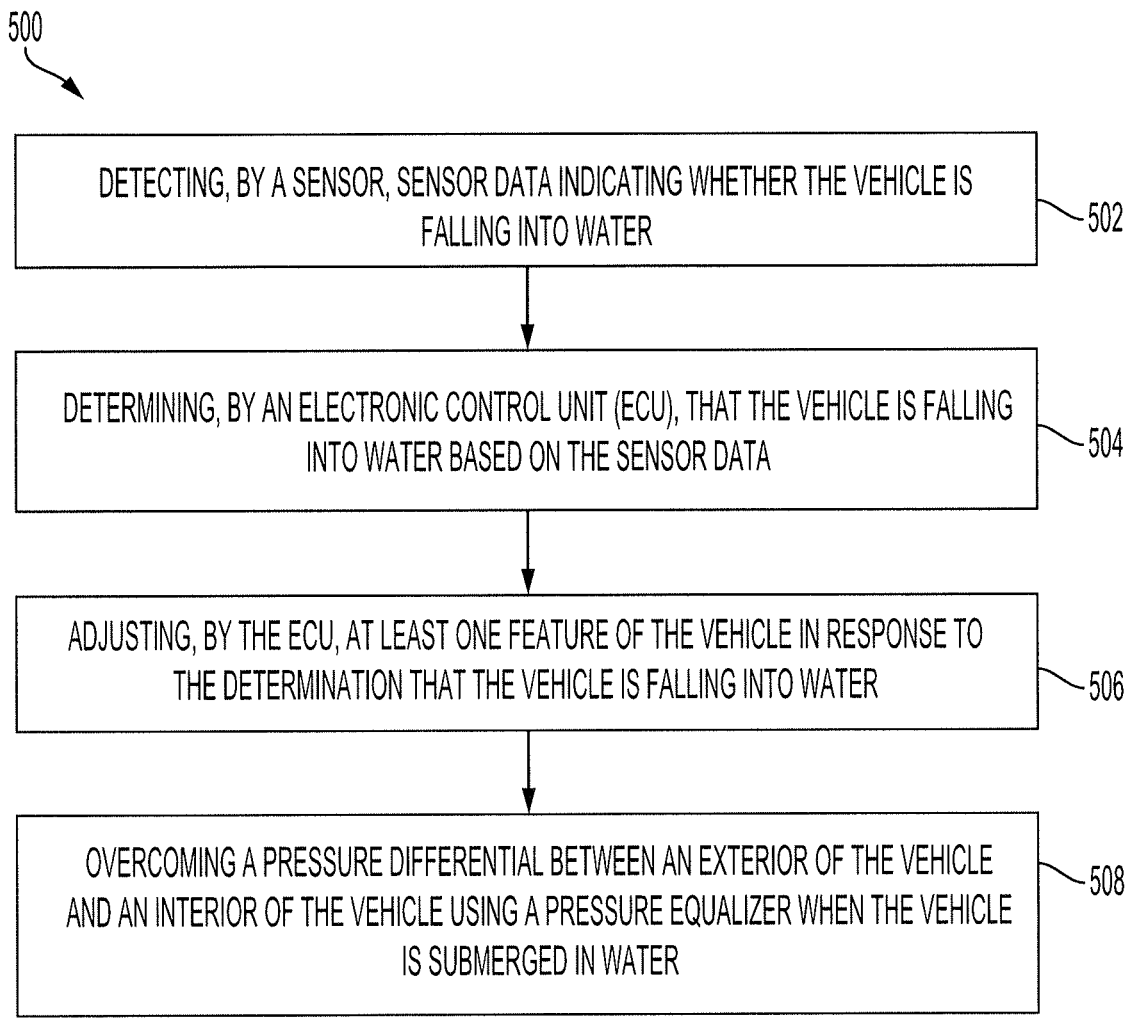
FIG. 5 illustrates a flow diagram of a process performed by the system, according to various embodiments of the invention.

FIG. 5 illustrates a flowchart of a process 500 performed by the systems described herein.

A sensor (e.g., a sensor of sensor array 410) detects sensor data indicating whether the vehicle (e.g., vehicle 402) is falling into water (step 502). The sensors may include a location sensor (e.g., location sensor 414) configured to detect location data, an IMU (e.g., IMU 416) configured to detect acceleration and/or orientation data, an image sensor (e.g., image sensor 418) configured to detect image data, a RADAR/LIDAR device (e.g., RADAR/LIDAR device 420) configured to detect spatial data, a wheel sensor (e.g., wheel sensor 422) configured to detect wheel rotation data, and/or a suspension sensor (e.g., suspension sensor 424) configured to detect suspension stroke data.

An electronic control unit (ECU) (e.g., ECU 404) determines that the vehicle is falling into the water based on the sensor data (step 504). The sensors described herein may be used collectively or may be used independently. Any one sensor may be used to detect that the vehicle is falling into water, or multiple sensors may be used to corroborate and confirm that the vehicle is falling into water. In some situations, the use of more sensors results in a more confident detection of falling into water. The ECU may use a weighted sum of the data, where the ECU determines that the vehicle is falling in water when the weighted sum exceeds a threshold value. The weights of the weighted sum may be static or may be dynamically determined based on location or other factors.

The ECU adjusts at least one feature of the vehicle in response to the determination that the vehicle is falling into water (step 506). The adjusting the at least one feature may include opening a window of the vehicle to allow water to enter the vehicle (as shown in FIG. 2C), controllably opening a door (e.g., door 202, 428) of the vehicle using an anchor (e.g., anchor 206) to allow water to enter the vehicle (as shown in FIG. 2B), or releasing a panel (e.g., panel 222, 434) of the vehicle to allow water to enter the vehicle (as shown in FIG. 2D).

Additionally, a pressure differential between an exterior of the vehicle and an interior of the vehicle may be overcome by a pressure equalizer (e.g., pressure equalizer 432) when the vehicle is submerged in water (step 508). In some embodiments, a pressure sensor (e.g., pressure sensor 426) may detect the pressure differential and the pressure equalizer may be operated based on the detected pressure differential, to provide a response appropriate for the situation.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for automatically responding to a vehicle falling towards water, the system comprising:
   a plurality of sensors configured to detect sensor data indicating whether the vehicle is falling in a direction towards the water; and
   an electronic control unit (ECU) connected to the plurality of sensors and configured to:
      determine that the vehicle is falling in the direction towards the water based on the sensor data, and
      control at least one component of the vehicle to be actuated automatically in response to the determination that the vehicle is falling in the direction towards the water.

2. The system of claim 1, wherein the plurality of sensors include at least one of a location sensor configured to detect location data, an inertial measurement unit configured to detect acceleration data, an image sensor configured to detect image data, a RADAR or LIDAR device configured to detect spatial data, a wheel sensor configured to detect wheel spin data, or a suspension sensor configured to detect suspension stroke data.

3. The system of claim 1, wherein the at least one component is at least one of a window of the vehicle, a door of the vehicle, or a panel of the vehicle.

4. The system of claim 3, wherein the control of the at least one component of the vehicle to be actuated automatically includes at least one of:
   control of the window of the vehicle to be opened to allow water to enter the vehicle,
   control of the door of the vehicle to be controllably opened using an anchor to allow water to enter the vehicle, or
   control of the panel of the vehicle to be released to allow water to enter the vehicle.

5. The system of claim 1, further comprising a pressure equalizer configured to overcome a pressure differential between an exterior of the vehicle and an interior of the vehicle when the vehicle is submerged in water.

6. The system of claim 5, wherein the pressure equalizer is at least one of an air compressor configured to increase a pressure within the interior of the vehicle to overcome the pressure differential, a hydro-compressor configured to bring water into the vehicle to overcome the pressure differential, or a door latch charge configured to propel a respective door open.

7. The system of claim 6, further comprising a pressure sensor configured to detect the pressure differential between the exterior of the vehicle and the interior of the vehicle when the vehicle is submerged in water, and
   wherein the pressure equalizer is further configured to operate based on the detected pressure differential from the pressure sensor.

8. A vehicle for automatically responding to falling towards water, the vehicle comprising:
   a plurality of sensors configured to detect sensor data indicating whether the vehicle is falling in a direction towards the water; and
   an electronic control unit (ECU) connected to the sensor plurality of sensors and configured to:
      determine that the vehicle is falling in the direction towards the water based on the sensor data, and
      control at least one component of the vehicle to be actuated automatically in response to the determination that the vehicle is falling in the direction towards the water.

9. The vehicle of claim 8, wherein the is plurality of sensors include at least one of a location sensor configured to detect location data, an inertial measurement unit configured to detect acceleration data, an image sensor configured to detect image data, a RADAR or LIDAR device configured to detect spatial data, a wheel sensor configured to detect wheel spin data, or a suspension sensor configured to detect suspension stroke data.

10. The vehicle of claim 8, wherein the at least one component is at least one of a window of the vehicle, a door of the vehicle, or a panel of the vehicle.

11. The vehicle of claim 10, wherein the control of the at least one component of the vehicle to be actuated automatically includes at least one of:
   control of the window of the vehicle to be opened to allow water to enter the vehicle, control of the door of the vehicle to be controllably opened using an anchor to allow water to enter the vehicle, or control of the panel of the vehicle to be released to allow water to enter the vehicle.

12. The vehicle of claim 8, further comprising a pressure equalizer configured to overcome a pressure differential between an exterior of the vehicle and an interior of the vehicle when the vehicle is submerged in water.

13. The vehicle of claim 12, wherein the pressure equalizer is at least one of an air compressor configured to increase a pressure within the interior of the vehicle to overcome the pressure differential, a hydro-compressor configured to bring water into the vehicle to overcome the pressure differential, or a door latch charge configured to propel a respective door open.

14. The vehicle of claim 13, further comprising a pressure sensor configured to detect the pressure differential between the exterior of the vehicle and the interior of the vehicle when the vehicle is submerged in water, and
wherein the pressure equalizer is further configured to operate based on the detected pressure differential from the pressure sensor.

15. A method for automatically responding to a vehicle falling towards water, the method comprising:
detecting, by a plurality of sensors, sensor data indicating whether the vehicle is falling in a direction towards the water;
determining, by an electronic control unit (ECU), that the vehicle is falling in the direction towards the water based on the sensor data; and
controlling, by the ECU, at least one component of the vehicle to be actuated automatically in response to the determination that the vehicle is falling in the direction towards the water.

16. The method of claim 15, wherein the detecting the sensor data includes at least one of detecting location data by a location sensor, detecting acceleration data by an inertial measurement unit, detecting image data by an image sensor, detecting spatial data by a RADAR or LIDAR device, detecting wheel spin data by a wheel sensor, or detecting suspension stroke data by a suspension sensor.

17. The method of claim 15, wherein the controlling the at least one component of the vehicle to be actuated automatically includes at least one of opening a window of the vehicle to allow water to enter the vehicle, controllably opening a door of the vehicle using an anchor to allow water to enter the vehicle, or releasing a panel of the vehicle to allow water to enter the vehicle.

18. The method of claim 15, further comprising overcoming, using a pressure equalizer and in response to the vehicle being submerged in water, a pressure differential between an exterior of the vehicle and an interior of the vehicle.

19. The method of claim 18, wherein the overcoming the pressure differential includes at least one of increasing a pressure within the interior of the vehicle using an air compressor, bringing water into the vehicle using a hydro-compressor, or propelling a door open using a door latch charge.

20. The method of claim 19, further comprising;
detecting, using a pressure sensor and in response to the vehicle being submerged in water, the pressure differential between the exterior of the vehicle and the interior of the vehicle; and
operating the pressure equalizer based on the detected pressure differential from the pressure sensor.

* * * * *